(12) United States Patent
Edgar

(10) Patent No.: US 6,380,539 B1
(45) Date of Patent: Apr. 30, 2002

(54) FOUR COLOR TRILINEAR CCD SCANNING

(75) Inventor: Albert D. Edgar, Austin, TX (US)

(73) Assignee: Applied Science Fiction, Inc., Austin, TX (US)

( * ) Notice: Subject to any disclaimer, the term of this patent is extended or adjusted under 35 U.S.C. 154(b) by 0 days.

(21) Appl. No.: 09/012,255

(22) Filed: Jan. 23, 1998

Related U.S. Application Data

(60) Provisional application No. 60/036,655, filed on Jan. 30, 1997.

(51) Int. Cl.$^7$ ............................................... G01N 21/88
(52) U.S. Cl. ............................. 250/339.05; 250/341.1
(58) Field of Search ............... 250/339.05, 339.06, 250/339.11, 340, 341.1, 208.1, 226, 330; 282/254; 348/274

(56) References Cited

U.S. PATENT DOCUMENTS

| | | | |
|---|---|---|---|
| 4,260,899 A | 4/1981 | Baker | 250/563 |
| 4,301,469 A | 11/1981 | Modeen et al. | |
| 4,302,108 A | 11/1981 | Timson | 356/359 |
| 4,462,860 A | 7/1984 | Szmanda | 156/626 |
| 4,670,779 A | 6/1987 | Nagano | 358/75 |
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |

(List continued on next page.)

FOREIGN PATENT DOCUMENTS

| | | | |
|---|---|---|---|
| DE | DE 28 21 868 A1 | 11/1979 | G01N/21/32 |
| DE | DE 196 36 867 C1 | 1/1998 | H04N/5/21 |
| EP | 1 547 811 | 6/1979 | H04N/3/36 |
| EP | 0 422 220 A1 | 4/1991 | A61B/6/03 |
| EP | 0 482 790 B1 | 4/1992 | H04N/1/40 |
| EP | 0 527 097 A2 | 2/1993 | H04N/1/40 |
| EP | 0 569 142 A1 | 11/1993 | H04N/5/253 |

(List continued on next page.)

OTHER PUBLICATIONS

*New Adaptive Vector Filter Based on Noise Estimate*, Mei Yu, et al., IEICE Trans Fundamentals, vol. E82, No. 6, Jun., 1999.

(List continued on next page.)

*Primary Examiner*—Scott J. Sugarman
*Assistant Examiner*—Richard Hanig
(74) *Attorney, Agent, or Firm*—Dinsmore & Shohl LLP

(57) ABSTRACT

A single pass scanner having a trilinear array, a source of white light, filters of the three primary colors and a separate source of infrared light is used in various methods of removing medium-based defects from a scanned film image. The method generates an infrared channel in addition to the common visible channels by covering the parallel rows of sensors in the trilinear array respectively with a red, green and blue filter to create the three color channels. Normally, each of the three color filters also passes infrared light, which is removed by filters external to the sensors. In a specific embodiment, interstitial in time between two visible light scans, the sensor is exposed to infrared light for a single scan. As the trilinear array sweeps across an image in time and spatial synchronization with the exposing lights, at least two visible channels and an infrared channel are generated.

50 Claims, 9 Drawing Sheets

U.S. PATENT DOCUMENTS

| | | | |
|---|---|---|---|
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,546,477 A | 8/1996 | Knowles et al. | |
| 5,550,566 A | 8/1996 | Hodgson et al. | 345/202 |
| 5,552,904 A | 9/1996 | Ryoo et al. | 358/518 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,606,379 A | 2/1997 | Williams | 396/308 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,729,631 A | 3/1998 | Wober et al. | 382/232 |
| 5,762,773 A | 3/1998 | Mehlo et al. | 358/474 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,966,465 A | 10/1999 | Keith et al. | |
| 5,969,372 A | 10/1999 | Stavely et al. | 250/559.42 |
| 5,979,011 A | 11/1999 | Mivawaki et al. | 15/308 |
| 5,982,936 A | 11/1999 | Tucker et al. | |
| 5,982,937 A | 11/1999 | Accad | |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |

FOREIGN PATENT DOCUMENTS

| | | | | |
|---|---|---|---|---|
| EP | 0 624 848 A2 | 11/1994 | | G06F/15/68 |
| EP | 0 699 753 A2 | 8/1995 | | H04N/1/407 |
| EP | 0 716 538 A2 | 6/1996 | | H04N/1/50 |
| EP | 0 751 670 A2 | 1/1997 | | H04N/1/10 |
| EP | 0 768 621 A2 | 4/1997 | | G06T/5/20 |
| EP | 0 794 454 A2 | 9/1997 | | G03B/27/73 |
| EP | 0 816 833 A2 | 1/1998 | | G01N/21/88 |
| EP | 0 816 833 A3 | 8/1998 | | G01N/21/88 |
| EP | 0 893 914 A2 | 1/1999 | | H04N/5/253 |
| GB | 1547811 | * | 1/1979 | 250/341.1 |
| GB | GB 2 283 633 A | | 5/1995 | H04N/5/262 |
| JP | 4-291139 | | 10/1992 | G01N/21/89 |
| JP | 11185028 | | 7/1999 | G06T/1/00 |
| JP | 2000-13604 | | 1/2000 | H04N/1/409 |
| JP | 2000-196813 A | | 7/2000 | H04N/1/04 |
| WO | WO 84/02019 | | 5/1984 | G06F/15/20 |
| WO | WO 89/06890 | | 7/1989 | H04N/3/36 |
| WO | WO 90/01240 | | 2/1990 | H04N/1/40 |
| WO | WO 91/09493 | | 6/1991 | H04N/5/127 |
| WO | WO 92/05469 | | 4/1992 | G03B/27/53 |
| WO | WO 95/15530 | | 6/1995 | G06F/17/14 |
| WO | WO 97/16028 | | 5/1997 | H04N/7/30 |
| WO | WO 98/31142 | | 7/1998 | H04N/5/253 |
| WO | WO 98/34397 | | 8/1998 | |
| WO | WO 99/40729 | | 8/1999 | H04N/9/11 |
| WO | WO 01/48694 | | 7/2001 | G06T/5/00 |

OTHER PUBLICATIONS

*A Robust Method for Parameter Estimation of Signal–Dependent Noise Models in Digital Images*, B. Aiazzi, et al., IEEE, 1997, pp. DSP 97 –601–604.

*A Regularized Iterative Image Restoration Algorithm*, Aggelos K. Katsaggelos, et al., IEEE, 1991, pp. 914–929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546–550.

*Anisotropic Spectral Magnitude Estimation Filters for Noise Reduction and Image Enhancement*, Til Aach, et al., IEEE, 1996, pp. 335–338.

*Adaptive–neighborhood filtering of images corrupted by signal–dependent noise*, Rangaraj M. Rangayyan et al., Applied Optics, vol. 37, No. 20, Jul. 10, 1998, pp. 4477–4487.

*Grayscale Characteristics*, Photographic Negatives The Nature of Color Images, pp. 163–168.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7–38, 1993.

*Digital ICE*, Applied Science Fiction, Inc. http://www.asf.com/html/oproducts/iceprod.html. Aug. 5, 1999.

*About Digital ICE Technology*, Applied Science Fiction, Inc.,http://www.asf.com/html/oproducts/icetech.html. Aug. 5, 1999.

*2–D Adaptive Volterra Filter for 2–D Nonlinear Channel Equalisation and Image Restoration*, J.N. Lin, et al., Electronic Letters, vol. 28, No. 2, Jan. 16, 1992, pp. 180–182.

* cited by examiner

FOUR COLOR TRILINEAR CCD SCANNING

RELATED APPLICATION

This application claims the benefit of U.S. Provisional Application No. 60/036,655, filed Jan. 30, 1997.

FIELD OF THE INVENTION

This invention relates to image enhancement and recovery, and more particularly to a method and apparatus for scanning color image data.

BACKGROUND OF THE INVENTION

Ever since the first image of an object was captured on film, a serious problem was apparent which has continued to plague the field of image capture and reproduction to the present day, namely imperfections in the recording medium itself which distort and obscure the original image sought to be captured. These imperfections occur in innumerable forms including dust, scratches, fingerprints, smudges and the like. Archival polypropylene sleeves employed to protect negatives even contribute to the problem by leaving hairline surface scratches as the negatives are pulled out of and replaced into the sleeves.

One method of approaching the problem of defective images is described by the present inventor in U.S. Pat. No. 5,266,805 issued to Edgar. In that system, image data is stored on a recording medium or substrate containing non-image imperfections such as film having surface scratches, wave smudges, bubbles, or the like, which give rise to undesirable artifacts in images subsequently retrieved from the medium or substrate. Means are provided for deriving from the medium separate images in the red, green, blue and infrared portions of the electromagnetic spectrum corresponding to the image stored. The infrared image is used as an indicator or map of the spatial position of the non-image imperfections on and in the medium so the defects can be reduced or eliminated. In this way, the desired underlying image is recovered.

The fundamentals of scanner technology for scanning and storing images in digital form are well developed and available in commercial products. Scanners receive an optical image, and divide it into many points, called pixels. The scanner measures light at each of these points to give each pixel a numerical value. Software associated with the scanner can then manipulate and store the pixel data. A color scanner measures several numerical values for each point, one for each primary color of red, green and blue. For example, a scanner may measure a pink pixel to have 80% red, 40% green, and 40% blue. All numbers representing one of the primary colors are grouped by the software into a channel, or single color image. Some scanners measure only one primary color at a time, then back up, change either the light source or a color filter to a second color, and measure only that second color on a second pass of the image. These are called multipass scanners. An example of a multipass scanner is the RFS 3570 made by Eastman Kodak Company.

Other scanners make a single pass, and collect all color information in that one pass. One type of single pass color scanner uses a linear array, or line of sensors. This array is moved, or scanned, perpendicularly across the image to scan all points on the image line by line. During this scan a light source is rapidly switched between the various colors to be sensed. One complete cycle of the colored light sources occurs for each line of pixels in the image. Thus a single point on the image is seen by a single sensor in the array first by one color, then by another color, and typically also by a third or fourth color, before that sensor moves on to another line of pixels on the image. Software is used to store the color-specific numerical information for each pixel into the appropriate channel so that at the end of the scan, multiple channels are available (one for each color). An example of a single pass scanner is the LS 1000 made by Nikon Corporation.

Another type of single pass scanner illuminates the image being scanned with light containing all visible colors, but places tiny color filters over the sensor elements so at any point in time there are sensors receiving each different color. One such method positions three linear arrays side by side to form a "trilinear array." One of the three arrays is placed under a red filter, one under a green filter, and the third under a blue filter. Typically these colored filters pass infrared light in addition to the color they are intended to pass, and for this reason the infrared light must be removed from the optical path by a separate filter elsewhere in the scanner, or the scanner must use a light source containing no infrared light. An example of a scanner employing a trilinear array is the SprintScan 35 made by Polaroid Corporation.

A problem arises when applying media surface defect correction to single pass scanners using trilinear arrays. The filters on standard trilinear arrays distinguish red, green, and blue light, but not the fourth "color" of infrared light necessary to practice surface defect correction. Further, to be compatible with existing color dyes that pass infrared light, infrared light is often removed from the optical path prior to reaching the sensor, precluding addition of a fourth line of sensors sensitive to infrared light.

The three sensor lines of a trilinear array typically are spaced by an integer multiple of the separation distance between pixels in the image. If the spacing integer is eight, then a specific point on the image may be sensed in red, and exactly eight steps later it may be sensed in green, and eight steps after that it may be sensed in blue. Thus, the same pixel is scanned at three different times. The software then realigns the color channels by moving each a multiple of eight steps so as to group together all of the pixels sensed in the same color. The spacing between sensor lines of the array is usually a power of two (such as 2, 4, 8, 16, 32, etc.) multiplied by the pixel spacing distance to allow the designer the option to choose submultiple resolutions. For example, if the spacing were ½50th of an inch, the scanner could operate at 2,000; 1,000; 500; or 250 dots per inch, while retaining alignment between the colors with the appropriate offset.

Trilinear array scanners operate at very high speed because three lines of an image are scanned simultaneously. In addition, they provide very good color registration because of the single pass and in spite of generally low cost transport mechanics. Thus, there is no need to halt movement of the image at each scan line, and this further increases the speed of the scan. However, the market needs an image scanner with the speed and cost advantages of a single pass trilinear array which also includes surface defect correction capabilities.

Yet another type of single pass scanner uses an area array to cover a two dimensional region of the image at once rather than mechanically scanning with a linear array to cover the region. One such scanner called a color filter matrix further incorporates tiny color filters over each element in the area array. In a specific implementation used in a Kodak digital camera, half the sensor elements lie under tiny green filters incorporated on the sensor array in a checkerboard pattern. The other half of the sensor elements in the checkerboard are behind alternating red and blue filters. Thus, a quarter of the sensors respond to red light, half respond to green light and a quarter respond to blue light. In another implementation in a Polaroid digital camera, an entire column of sensors is behind tiny red filters, the adjacent column of sensors is behind tiny green filters, and the next column of sensors is behind tiny blue filters. This pattern repeats in additional columns. In yet another implementation common in video cameras, the colored filters on even rows are green and magenta, and the filters on odd rows are cyan and yellow. Because the array is not mechanically scanned, each pixel in the image is measured with only one of the three colors, as opposed to the other scanners discussed so far that measure each pixel of the image with three colors. As with the trilinear array discussed above, all the colored filters pass infrared light, and therefore infrared light must be removed by a separate filter elsewhere in the optical path.

Another important consideration for image scanners is data compression due to the rather large amount of pixel data which may be detected by image scanners. Scanners that only sense a single specific color from each specific pixel, such as those employing a color filter matrix, produce only one-third as much raw data as a scanner that senses all three colors from each pixel, and therefore such scanners employ a form of data compression. For a purely black and white image, detail can be resolved at the full pixel resolution of the scanner because for a black and white image, it does not matter whether a pixel senses in red, green, or blue light. On the other hand, problems may occur in the details of a color image where a point of white light aligns with a red sensor and so appears red, or with a blue sensor and so appears blue. It is known that this aliasing problem can be reduced by controlled blurring of the image so that a point of light will always cover several color sensors; however, this anti-alias blurring has the disadvantage of reducing image sharpness.

Another form of data compression of colored images adds the three primary colors to form a black and white image, called a Y channel image, that is stored at full resolution. Red and blue channel images are then individually differenced with this Y channel image. Typically the red channel minus the Y channel is called the U channel and the blue channel minus the Y channel is called the V channel. The U and V channel images are stored at lower resolutions than the Y channel image. In a specific implementation, alternating pixels store both Y and U records, and the next pixel stores both Y and V records, two numbers per pixel rather than three numbers needed to store all three primary colors. However, the disadvantage with using so called YUV color space is that 75% of the state space is wasted; that is, if Y, U, and V numbers were generated randomly within the full range appropriate to each, 75% of the generated numbers would produce invalid colors, or colors outside the range of real world colors.

Single chip color area sensors, commonly used in almost all consumer electronic imaging products, place color filters over each sensor in a single two dimensional array of sensors. Thus each pixel represents a single color, and this may be thought of as a data compression scheme in which two of the three primary colors are discarded for each pixel. Several patterns of colors are available in the art, such as the Bayer array that assigns half the pixels to green in a checkerboard; the striped color array such as that used in a Polaroid digital camera in which entire columns cycle between red, green, and blue; and a technique commonly used in video cameras that uses cyan, magenta, yellow, and green in a repeating square. All of these techniques have been previously described above.

It is, therefore, an object of this invention to provide an improved method and apparatus for scanning images with a variety of sensor arrangements.

It is yet another object of the present invention to scan images so that the image data may be compressed for easier storage and manipulation.

It is still another object of the present invention to provide an improved method and apparatus for scanning images which decreases the time it takes to scan the image.

It is another object of the present invention to provide a method and apparatus for recovering a scanned color image.

It is another object of the present invention to provide a method and apparatus for scanning images with infrared light in a single pass using a color filter matrix.

It is another object of the present invention to provide a method and apparatus for scanning images with infrared light in a single pass using an existing color filter matrix.

It is another object of this invention to provide a method and apparatus for scanning images under visible and infrared light so that surface defects in the scanned images are reduced or eliminated.

To achieve these and other objects which will become readily apparent upon reading the attached disclosure and appended claims, an improved method and apparatus for scanning an image is provided. Additional objects, advantages, and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

SUMMARY OF THE INVENTION

The present invention provides an improved method and apparatus for scanning an image. A plurality of sensors is arranged in groups. The first group of sensors is behind a filter material selective to both a first color and infrared light. A second group is behind a second filter material which is selective to a second different color and infrared light. An image at a first scan time is illuminated with light functionally free of infrared which is sensed with the first group of sensors to generate a first color image, and with the second group of sensors to generate a second color image. The image is then illuminated by a second light source containing infrared at a second scan time and sensed by at least one of the first or second group of sensors to generate an infrared image. From the first color image, the second color image, and the infrared image, a corrected color image is generated which is substantially free of media-based defects.

DETAILED DESCRIPTION

A suitable apparatus for practicing the present invention may be constructed by modifying the design of a typical single pass image scanner utilizing a trilinear array and a gas discharge tube that diffuses white light. About ten light emitting diodes ("LEDs") may be attached around the gas discharge tube in a pattern that does not directly interfere with the light path between the tube and the film substrate being illuminated. A suitable LED is an aluminum gallium arsenide LED manufactured by Cleairex Technology, Inc. of Plano, Tex. These LEDs may be pulsed in sync with every third scan of the scanner by an external computer programmed to monitor the operation of the scanner. Overall illumination of the substrate may need to be attenuated to avoid saturation. The attenuation may be accomplished by adding a 64% passing neutral density filter, such as a Kodak ND 0.3, to the optical path. After scanning the image, the processes described below are applied to the pixel data generated by the scanner to separate out the infrared channel, to reconstruct missing colors, and to apply surface defect correction. To reduce the amount of data to be processed, a simple data compression scheme may be used for color images that avoids the previously described inefficiencies of YUV color space while still providing less aliasing than the single color per pixel method common in color area array sensors.

Figure 1:
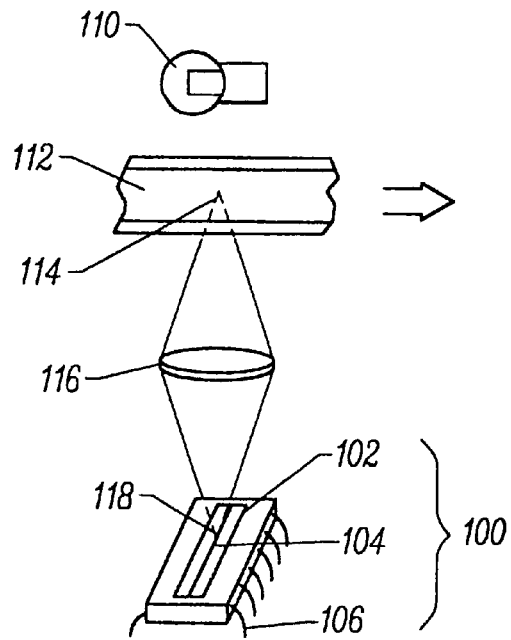
FIG. 1 is a perspective view of a prior art trilinear array component as used in a typical image scanning application.

Considering this embodiment of the invention in more detail, FIG. 1 shows a typical trilinear array component 100 used in a single pass scanner. A long rectangular window 102 in the component 100 exposes a line of sensor elements 104, typically laid in parallel with a CCD shift register (not shown) to receive the charges from the sensor elements 104 and shift those charges to an amplifier (not shown). The amplifier is typically etched into the same silicon die as component 100, which outputs the amplified signal through pin connectors 106 for further processing. In this type of scanner application, light from a lamp 110, which may be a gas discharge tube, illuminates an image on a film substrate 112. A specific point 114 on this image is focused with lens 116 onto a specific sensor element 118 within line 104 of the trilinear array 100. Typically the film substrate 112 is moved perpendicularly to the direction of the line 104 (as shown by the arrow) to complete a two dimensional scan of the image.

Figure 2:
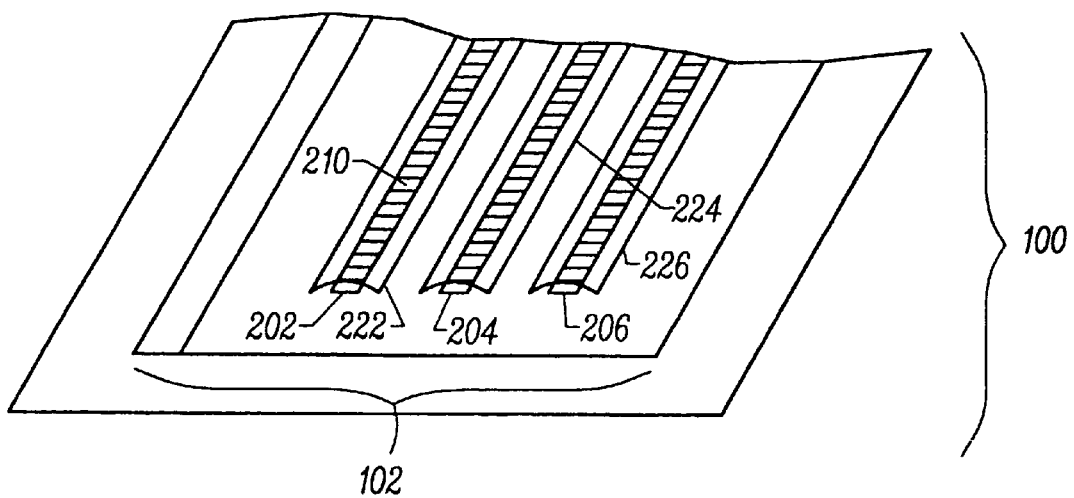
FIG. 2 is a magnified view of part of the trilinear array component shown in FIG. 1.

FIG. 2 shows a magnified view of the trilinear array component 100 of FIG. 1. As seen in FIG. 2, the rectangular window 102 contains three separate sensor lines 202, 204, and 206, each of which consists of many individual sensing elements 210. The sensor lines 202, 204, and 206 may each lie behind colored filters 222, 224 and 226, respectively, so that any illuminating light must pass through, and be affected by, these filters. Filter 222 over sensor line 202 passes both red and infrared light, filter 224 over line 204 passes green and infrared light, and filter 226 over line 206 passes blue and infrared light. The specific order and color of the colored filters 222, 224 and 226 can be rearranged as desired.

Figure 3:
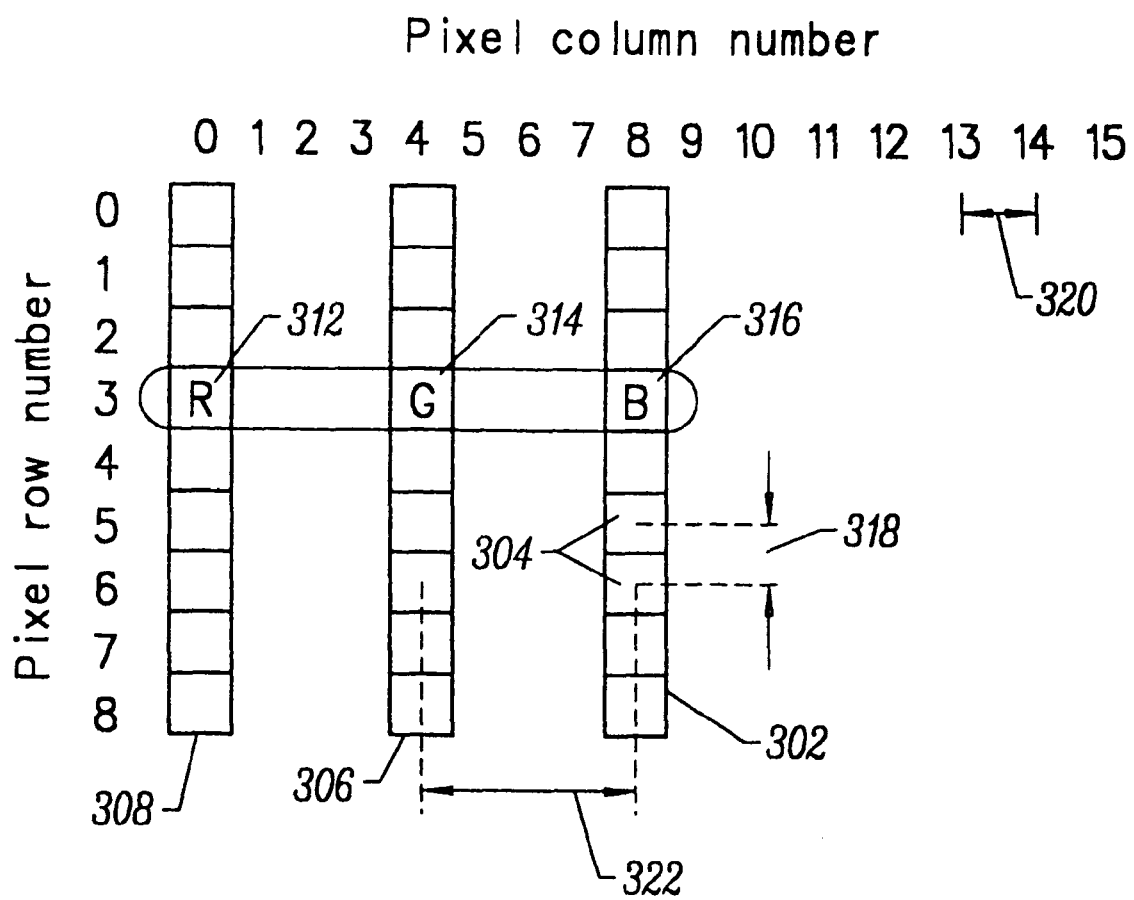
FIG. 3 is a graphical representation of a trilinear array component.

In FIG. 3, the layout of the sensors in the trilinear array 100 of FIG. 2 is represented graphically. The sensor line 302 under the blue selecting filter, called the blue column, consists of individual pixel sensors 304. The spacing of these sensors 304 is referred to as the sensor row pitch 318, and is usually the same as the pixel column pitch 320. Similarly, there is a green column 306 and a red column 308. The spacing of these columns is known as the sensor column pitch 322. Typically, the sensor column pitch 322 is a power of two (such as 2, 4, 8, 16, 32, etc.) times the sensor row pitch 318 to allow easy reduction to scans at resolutions reduced from the highest resolution by powers of two. In a typical application, the ratio of sensor column pitch 322 to sensor row pitch 318 is 32, although a ratio of 4 is used in FIG. 3 for simplicity. In the representative trilinear array of FIG. 3, a single sensor row 310 consists of a single red sensor 312, a single green sensor 314, and a single blue sensor 316, each separated by the sensor column pitch 322. In actual use, the image being scanned and the trilinear array move relative to each other in a direction perpendicular to the sensor lines. Individual scans of the image are made at increments of the pixel column pitch 320, thereby producing a scanned image with image pixels spaced according to both the pixel column pitch 320 and the pixel row pitch 318. This process creates scanned image information in a two-dimensional array of pixels wherein any specific pixel may be referenced by a column and row designation.

Figure 4:
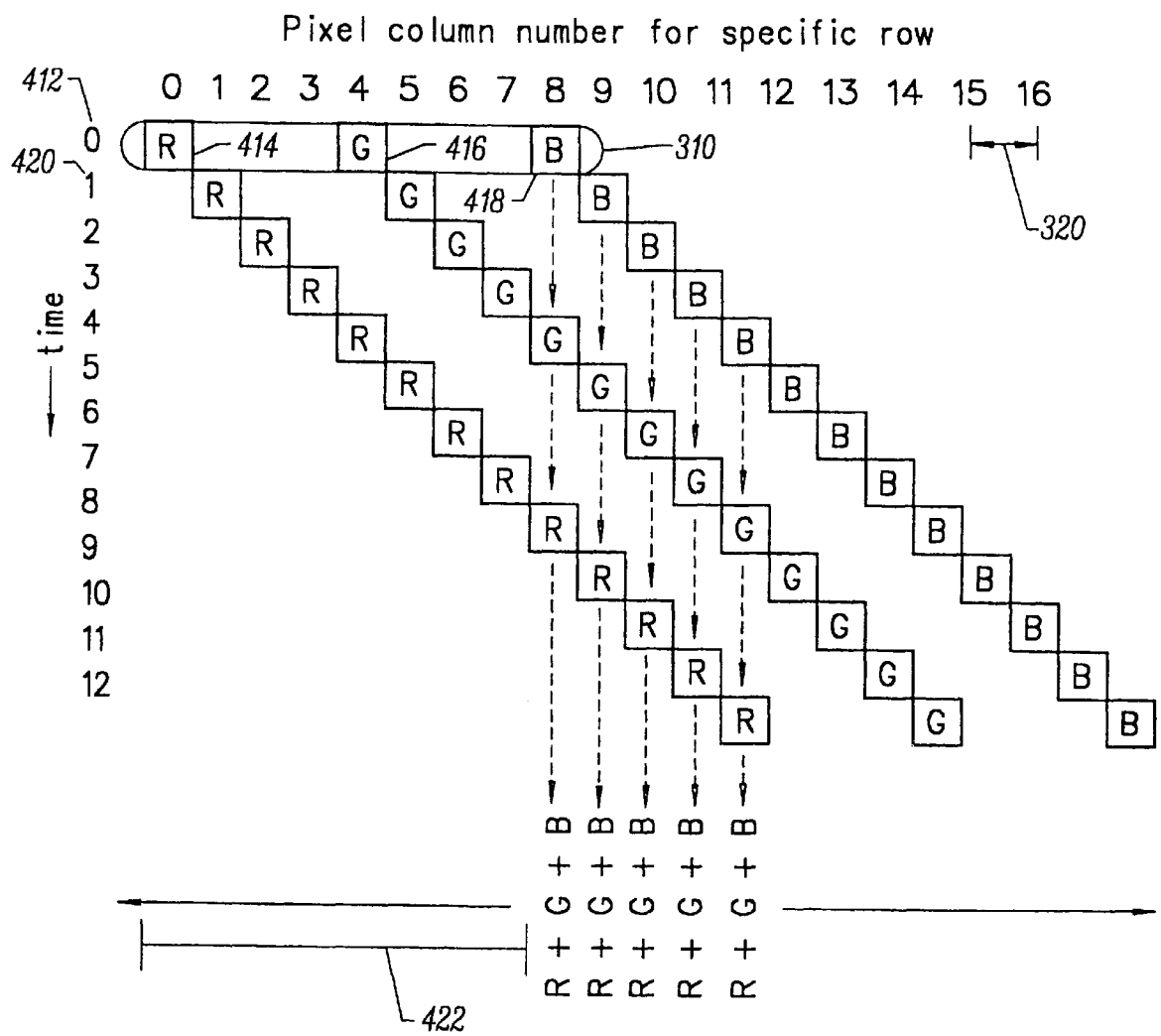
FIG. 4 is a graphical representation of the scanning of a single row of pixels shown in FIG. 3.

FIG. 4 illustrates the movement of and image data collection from a single sensor row 310 (originally shown in FIG. 3) of a trilinear array. For purposes of illustration, the vertical axis in FIG. 4 represents the passage of time during a scan performed by sensor row 310. At a first scan time 412, the red sensor 414 aligns with pixel column 0 of the image, the green sensor 416 aligns with pixel column 4, and the blue sensor 418 aligns with pixel column 8. At the next scan time 420, each of these sensors 414, 416, and 418 has moved to the right a distance equal to the pixel column pitch 320. As is evident in FIG. 4, pixel column 8 is the first column to be sensed by all three colored sensors. In order to complete the image scan, at some later point in time the trilinear array must reposition over the image to allow scanning of columns 0 through 7 by the green and blue sensors 416 and 418. The first few columns which are not scanned by all the sensors before repositioning the sensor array define a distance referred to as the preamble 422. After the scanning process has repeated a fixed number of times to fill the preamble 422, each pixel column will have been sensed by all three colored sensors. Specifically, note that at pixel column 8, the red sensor 414 made a pass at time 8, the green sensor 416 made a pass at time 4, and the blue sensor 418 made a pass at time 0. In this way, a trilinear array can sense the red, green, and blue components of every pixel of an image even though the individual colored sensor columns do not lie directly on top of each other.

Figure 5:
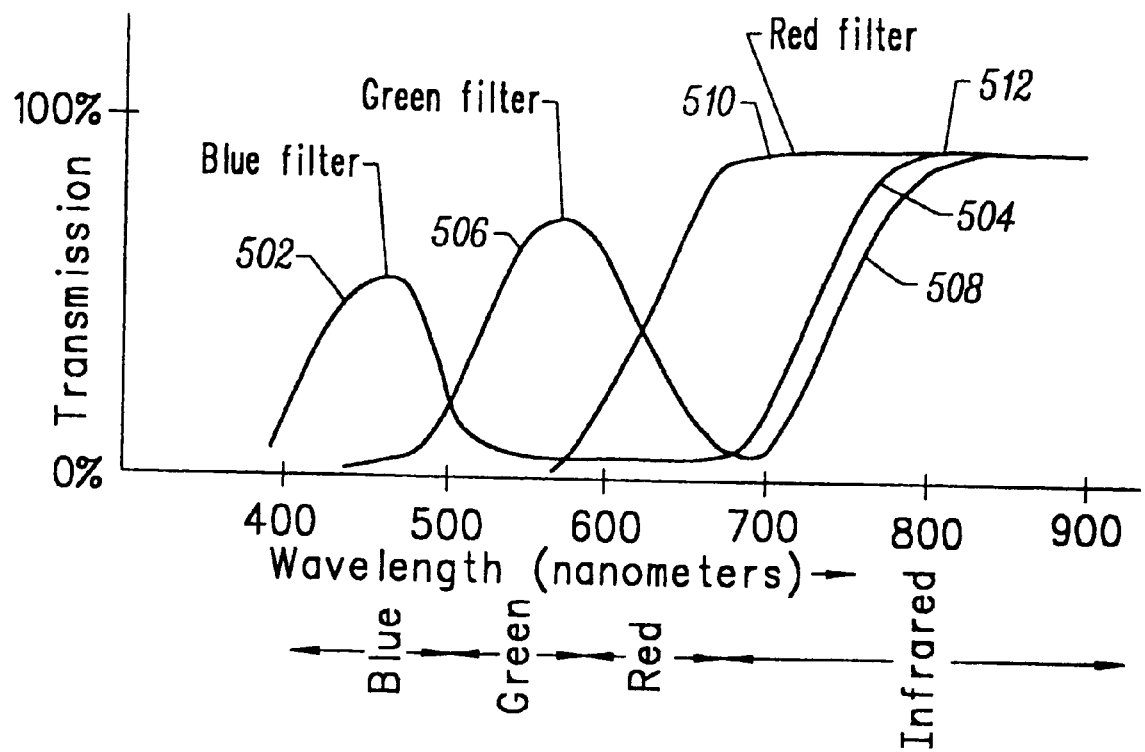
FIG. 5 is a graph of visible and infrared light transmissivity.

FIG. 5 illustrates a characteristic of almost all colored filters to pass infrared light to the sensors 414, 416 or 418 of FIG. 4. In particular, the thin colored filters used in typical trilinear arrays pass not only the colored light for which they were designed to be specific, but also any infrared light present at the time of the scan. The graph in FIG. 5 shows the transmissivity of light through blue, green and red filters versus the wavelength of the light. The blue filter transmits visible light at wavelengths between 400–500 nanometers as shown by curve 502, and also transmits infrared light having wavelengths beyond 750 nanometers as shown at 504. Curve 506 shows that a green filter transmits visible light at wavelengths between 500–600 nanometers, and also transmits infrared light as evidenced at 508. Curve 510 illustrates that a red filter transmits visible light at wavelengths between 600–700 nanometers, and also transmits infrared light at 512. To generate a scan in color, normally the infrared light must be removed from the illuminating light source. Alternatively, the light source may be functionally free of infrared light. This occurs when the amount of infrared light in the light source is known, such as 10%, and so may be mathematically removed from the scanned pixel information. For purposes of this disclosure, a light source which is functionally free of infrared light includes complete or partial elimination of infrared light from the light source. If the illuminating light source contains only infrared light, then all three sensors will transmit it. Thus, the scanner becomes an infrared scanner in which each pixel is scanned three times, once with each sensor line of the trilinear array.

Figure 6:
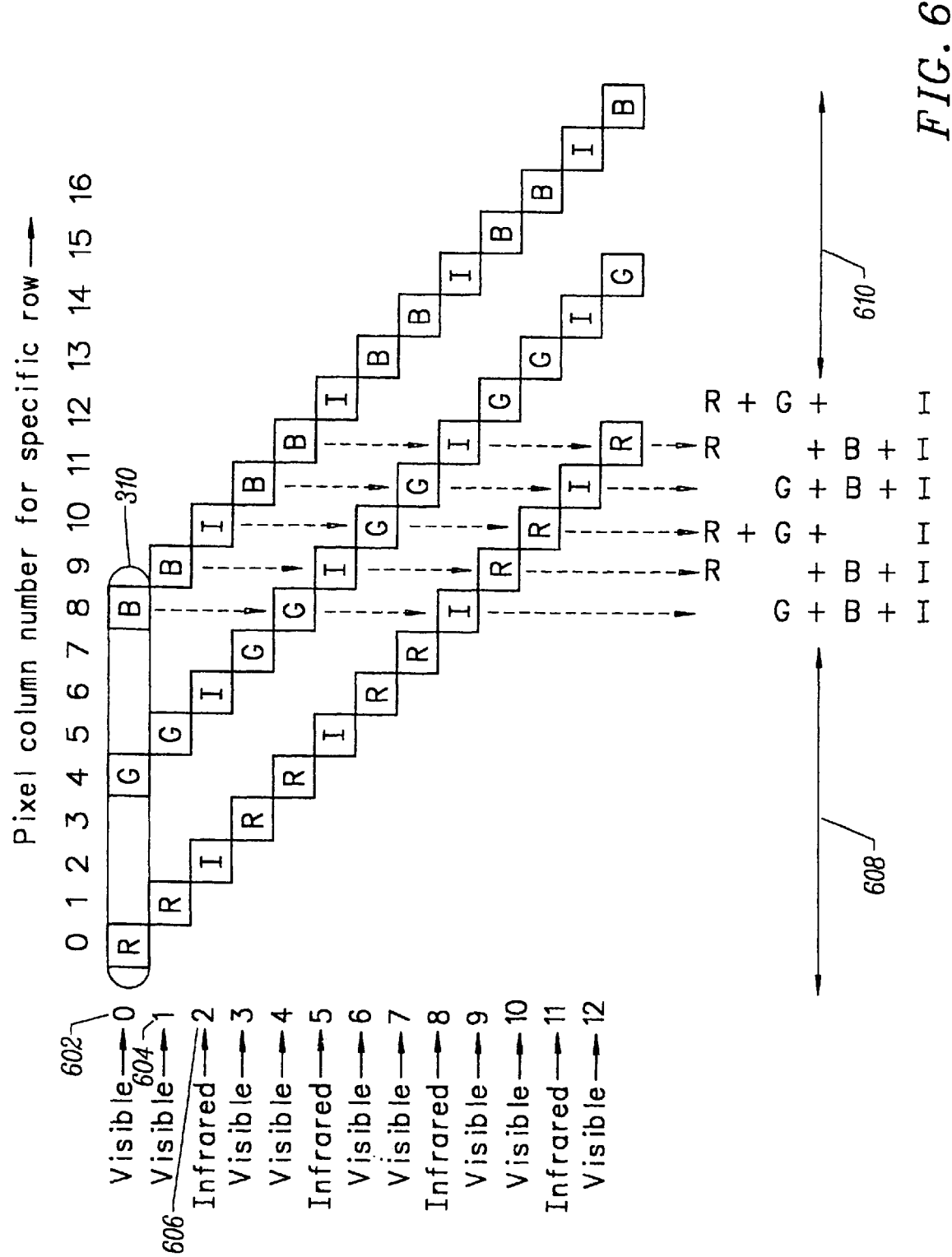
FIG. 6 is a graphical representation of a scan of a single row of pixels by a trilinear array component with alternating visible and infrared light sources.

FIG. 6 illustrates movement and data collection of a single sensor row 310 when the illuminating light source is alternately switched during the scan between a light source containing red, green, and blue (R, G, B), but no infrared light; and a light containing only infrared (I) light. Specifically, the visible light source is on for scans at times 0 and 1 (602 and 604, respectively). The illumination source then switches to infrared light for the scan at time 2 at 606, and the cycle is repeated. As seen in FIG. 6, this results in each pixel between the preamble 608 and postamble 610 being sensed in infrared light and in two of the three colors (red, green and blue). In particular, column 8 is sensed in infrared light and all colors except red, column 9 in infrared light and all colors except green, and column 10 in infrared light and all colors except blue. This sequence repeats across the image.

The scanning method shown in FIG. 6 uses a single pass scanner with a trilinear color sensor and a physically modified illuminating light source to generate a scan in which each pixel has an infrared record. This infrared record can be used to remove the effects of surface defects by dividing the visible records by the corresponding infrared records. More details on this method of surface defect correction may be found in U.S. Pat. No. 5,266,805 issued to the present inventor. Following surface defect correction, a relatively defect-free image remains in which each pixel is deficient in one of the three color components. However, these missing color components may be approximated from the adjacent color components which were detected by the corresponding color sensor.

The missing color components may potentially lower the quality of the scanned image. In practice, however, it has been found that negligible quality is actually lost if the missing color is estimated using methods disclosed below. This is because the important luminance resolution of a black and white image remains unaltered by discarding one of the three color components. The resolution reduction is confined entirely to the chrominance channel; however, as in television and JPEG compression, the color resolution can be significantly reduced relative to the luminance resolution. Discarding one of the three color components provides true data compression that reduces the data size of an image while potentially losing negligible quality. In the case of a scanner, this type of data compression permits the addition of infrared-responsive surface defect correction without mandating the scan time penalty of making a fourth scan. With the method of FIG. 6, the scanner proceeds at the same speed as in the non-infrared sensing method shown in FIG. 4.

Figure 7:
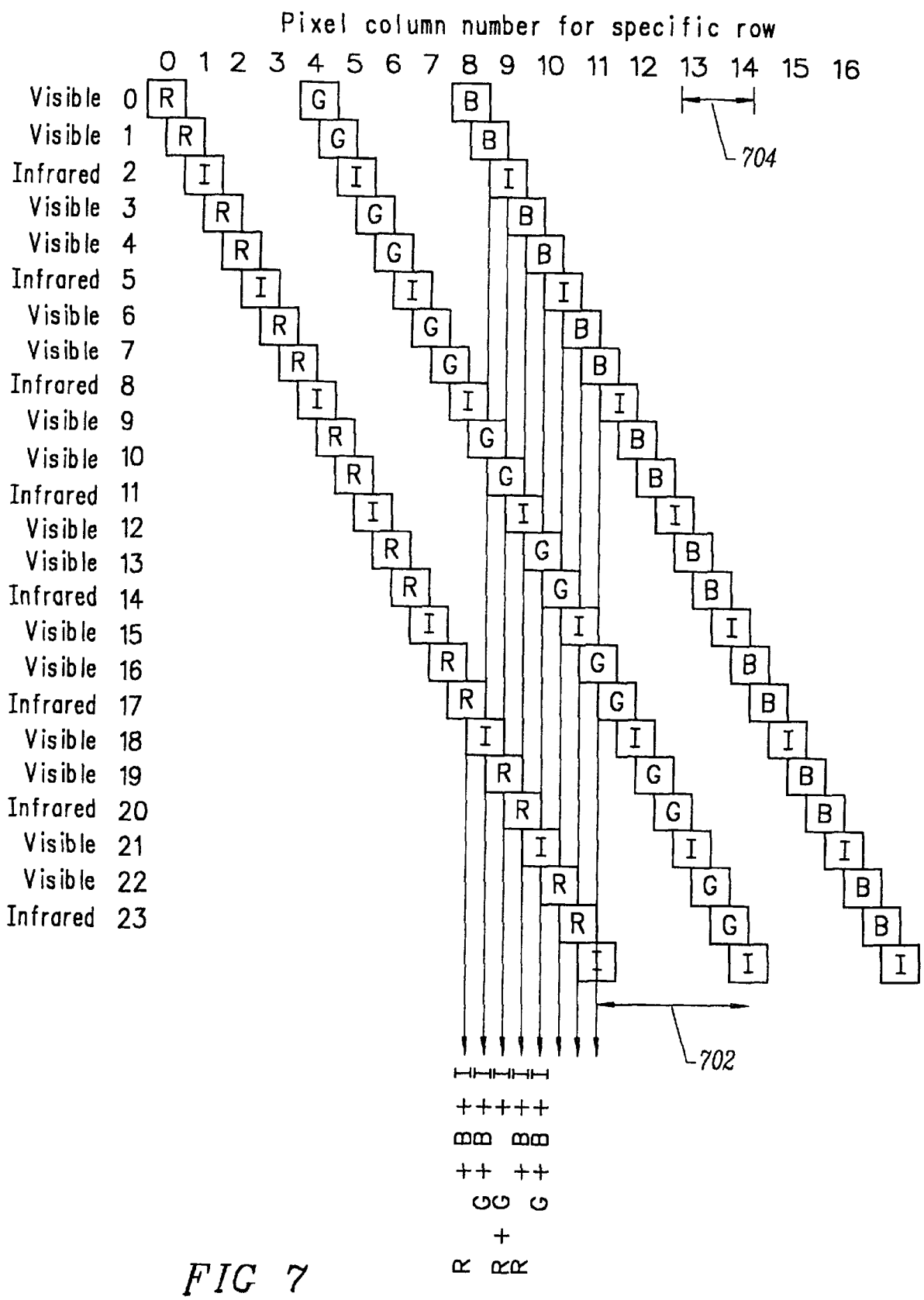
FIG. 7 is a graphical representation of a single row infrared scan at an increased resolution.

In situations where no data loss can be tolerated, the pixel column pitch can be reduced to produce a higher resolution scan. An interesting case results when the pixel column pitch is reduced to ⅔ of the pixel row pitch, so the loss of one of the three color components at each pixel is compensated with 3/2 the number of pixels. After this higher resolution scan, the image can be sized down so the resized pixel column pitch again matches the pixel row pitch. Of course, the increase in resolution does not need to be 3/2, but may be any convenient number. FIG. 7 illustrates the case where the resolution is doubled. In fact, it cannot normally be increased to 3/2. This may be explained as follows. If the ratio of the sensor column pitch 702 to the pixel column pitch 704 is "N," then in order for individual scans to align, "N" must be an integer. Furthermore, in order to distribute the infrared pixel information evenly, "N" must not be a multiple of three. If "N" were simply multiplied by 3/2 as a result of increasing resolution, then if "N" were still an integer, the product would have three as a factor. In practice, when "N" is a multiple of three, the resulting scan produces a cycle of two columns with red, green, and blue but no infrared pixel information, followed by a column with infrared information sensed three times. In the case illustrated in FIG. 6 where "N" is 4, "N" could be increased to 5, 7, or even 8 (as illustrated in FIG. 7) but not to 6 or 9 if this problem is to be avoided.

Figure 8:
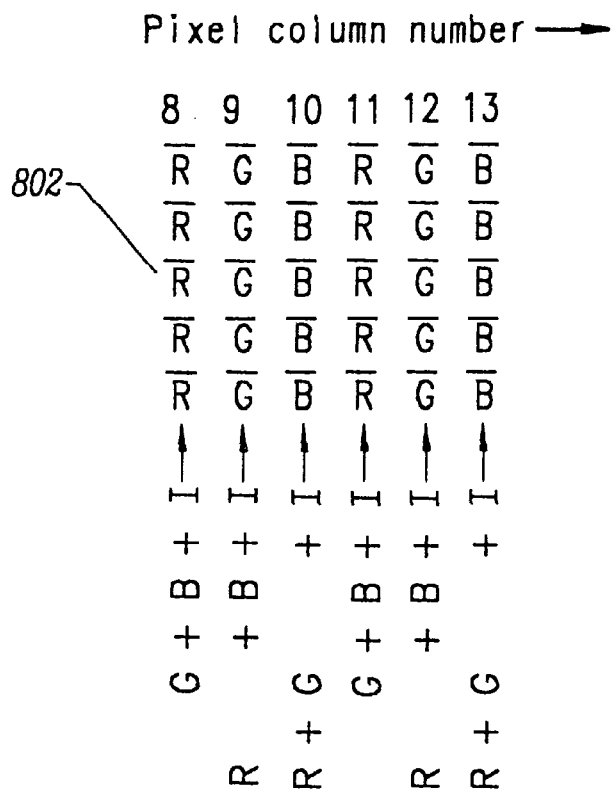
FIG. 8 illustrates an alternative representation of the information shown in FIG. 6 and indicates the color component not present.
Figure 9:
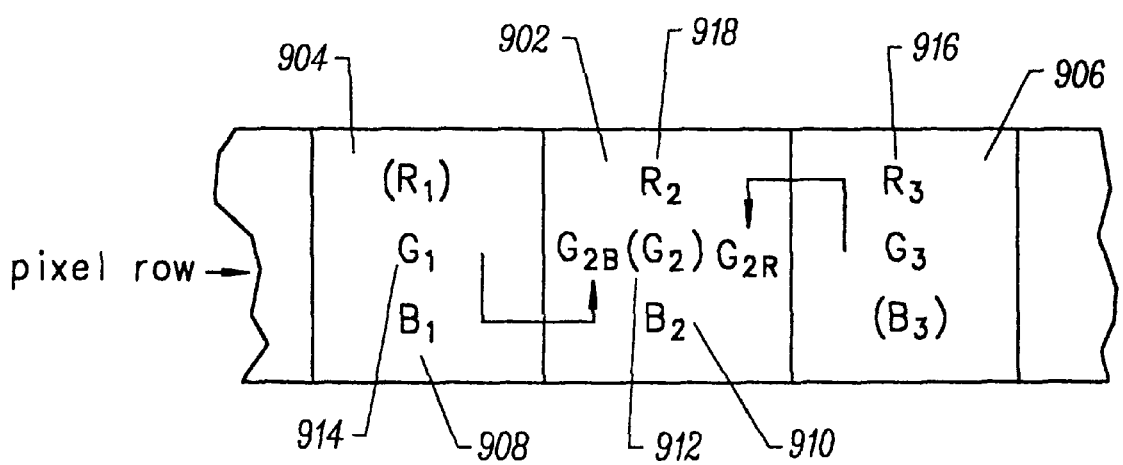
FIG. 9 is a graphical representation of three pixels used in conjunction with a method for recovering missing color components.

FIG. 8 illustrates the topology of FIG. 6 in an alternative representation. The missing red color component in pixel column 8 of FIG. 6 is shown as R ("R bar" or "not R") at 802. The missing colors in the other rows are analogously shown under a bar. FIG. 9 portrays a method for decompressing pixel data to recover missing color information when the illuminating light source is switched between visible and infrared light during image scanning (as previously described in conjunction with FIG. 6). For purposes of illustration, the method is described for recovering green from a pixel missing green 902, which lies between a pixel missing red 904 and a pixel missing blue 906. Missing pixel color information is indicated in FIG. 9 by the first letter of the missing color in parentheses. This general method applies to any color combination by substituting the corresponding names for the missing colors. The simplest method of estimating the missing green pixel value G2 of the center pixel 902 is to average the green pixel values of the immediately adjacent pixels 904 and 906.

An alternative embodiment for recovering the missing green pixel value of center pixel 902 is to use the known color pixel values of the surrounding pixels and their corresponding rates of change. Most images are primarily monochromatic, so red, green, and blue colors within a small region of the image tend to change with similar degree. In the example shown in FIG. 9, the blue values B1 908 and B2 910 for the left and center pixels are known. The difference B2−B1 specifies how fast detail in the image is causing blue to change when moving from the left pixel 904 to the center pixel 902. If it is assumed that the color green is changing across these same two pixels at about the same speed as the color blue changes, then the value of the green estimate of G2 912 originally obtained by averaging the green values of the adjacent pixels may be improved by adding the change in blue to G1 914, the left pixel, to give a new value of green for the center pixel G2B. Similarly, the estimate of G2 912 may be improved by using the change in red between the right pixel R3 916 and the center pixel R2 918 to give an estimate of the change in green G2R based on the change in red. Averaging the two new estimates G2B and G2R gives an estimate for G2 912 that is theoretically perfect for a monochrome image, and very good for real world images.

Additional variations on the data compression method described above are possible. For example, the difference in pixel color values may be calculated in the logarithmic domain which has the effect of multiplying G1 914 by the ratio of B2 910 over B1 908 to produce the estimate G2B. This causes the estimate of green for the center pixel 902 to track the percentage change of blue when moving from the left pixel 904 to the center pixel 902 rather than using just the absolute difference. This variation gives a good prediction for any image that is constantly colored, but may introduce noise in the missing primary of saturated colors. Yet another mathematical variation on the method uses the square root domain. The square root domain provides a compromise between the linear and logarithmic cases, and most images are stored in computer memory in this mode. The use of the word "subtraction" in the previously described methods is generally meant to include all such differencing operations described above. A further refinement of the method of FIG. 9 acknowledges that the colors, on average, do not all change exactly the same. This is done by multiplying the change in blue B2–B1 and in red R2–R3 by a factor close to, but less than unity, for example 0.9. The value for the factor can be calculated based on the correlation between the colors in an adjacent region around the missing color element.

Figure 10:
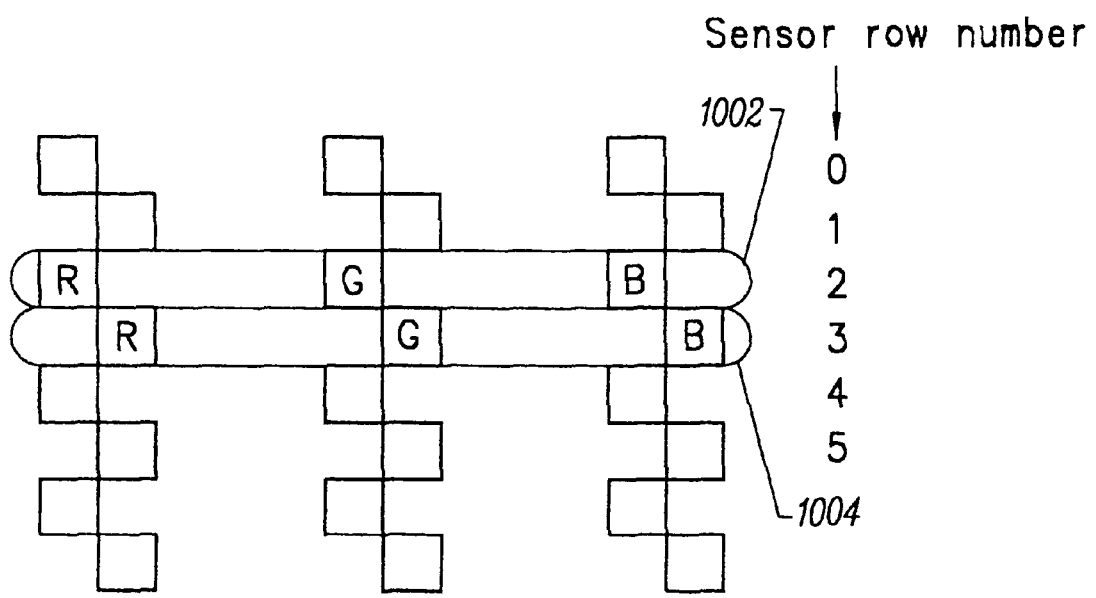
FIG. 10 illustrates an alternate embodiment of a trilinear array.
Figure 11:
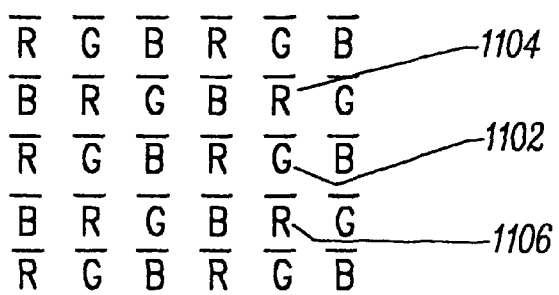
FIG. 11 is a graphical representation of the color pattern generated by the trilinear array of FIG. 10.

Often in a data compression method, it is not desirable to treat all pixel data in a given column of an image exactly alike. FIG. 10 shows an alternate topology of a trilinear array in which pixels of the even sensor rows, such as row 2 at 1002, are offset by one pixel spacing from the odd sensor rows, such as row 3 at 1004. This array produces the missing color pattern illustrated in FIG. 11. Recovery of the missing colors could proceed using any of the methods described in conjunction with FIG. 9. Furthermore, recovery could also use the differences from pixels above and below, rather than just to the left and right of each pixel, because the pixels above and below are missing a color different from the one being calculated. For example, to estimate the missing green information of pixel 1102, one can add the change in blue from pixel 1104 to 1102 to the green of pixel 1104 to give a top green estimate; add the change in blue from pixel 1106 to pixel 1102 to the green of pixel 1106 to provide a bottom green estimate, and average these with the left and right estimates as previously described to give an improved estimate of the missing green data of pixel 1102.

Other trilinear array topologies are possible. For example, in the sensor of FIG. 10, row 0 and 1 can remain as shown, but row 2 may be offset two pixel columns to the right of row 0. This pattern may be repeated so row 3 is again aligned with row 0, row 4 is offset one pixel to the right, and row 5 is offset two pixels to the right. This produces a sensor pattern in which the missing color of the pixel directly above a given pixel is different than the missing color of the pixel directly below that given pixel. Still other sensor offsets are possible with the intent of more randomly dispersing the missing colors throughout the image. Such an offset helps reduce or prevent a sequence of vertical lines in the scanned image which would be likely to create a moire effect.

Figure 12:
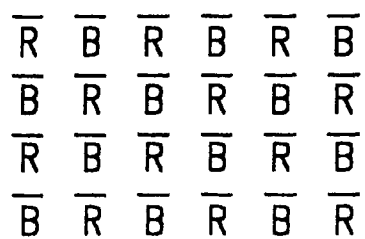
FIG. 12 is a graphical representation of a color pattern produced by a scanner in which no pixel lacks green.

FIG. 12 portrays a pattern of missing pixels in which no pixel lacks green, but in which red and blue are each missing throughout the scanned image in a complementary checkerboard pattern. All color differences are calculated relative to green in estimating the red and blue missing colors. Such a green priority pattern provides the data compression described herein with less image quality loss.

In general, the reconstruction of missing colors can be performed on the image as it is scanned. Then, after reconstruction of each color, including the reconstructed color, is divided by the associated infrared information to perform surface defect correction. Alternately, each color can be divided by the associated infrared data to perform surface defect correction as soon as it is scanned, and then after surface defect correction the reconstruction of missing colors performed on the defect corrected scanned colors.

As previously described, there is a need for illuminating light sources which are switched between infrared and visible in order to practice this invention. Typical switchable visible light sources include a pure gas discharge tube, such as xenon, or light emitting diodes. In a more typical scenario the illuminating light contains a visible source that cannot be rapidly switched. Visible light sources such as incandescent lights glow with heat for several milliseconds after the power is removed. Visible light sources such as mercury vapor discharge tubes glow for several milliseconds after the power is removed because of the phosphor used to convert the ultraviolet light of mercury into visible light. Thus, even though the ultraviolet and mercury frequency band components turn off rapidly, the phosphor continues to glow with visible light for some time.

Figure 13:
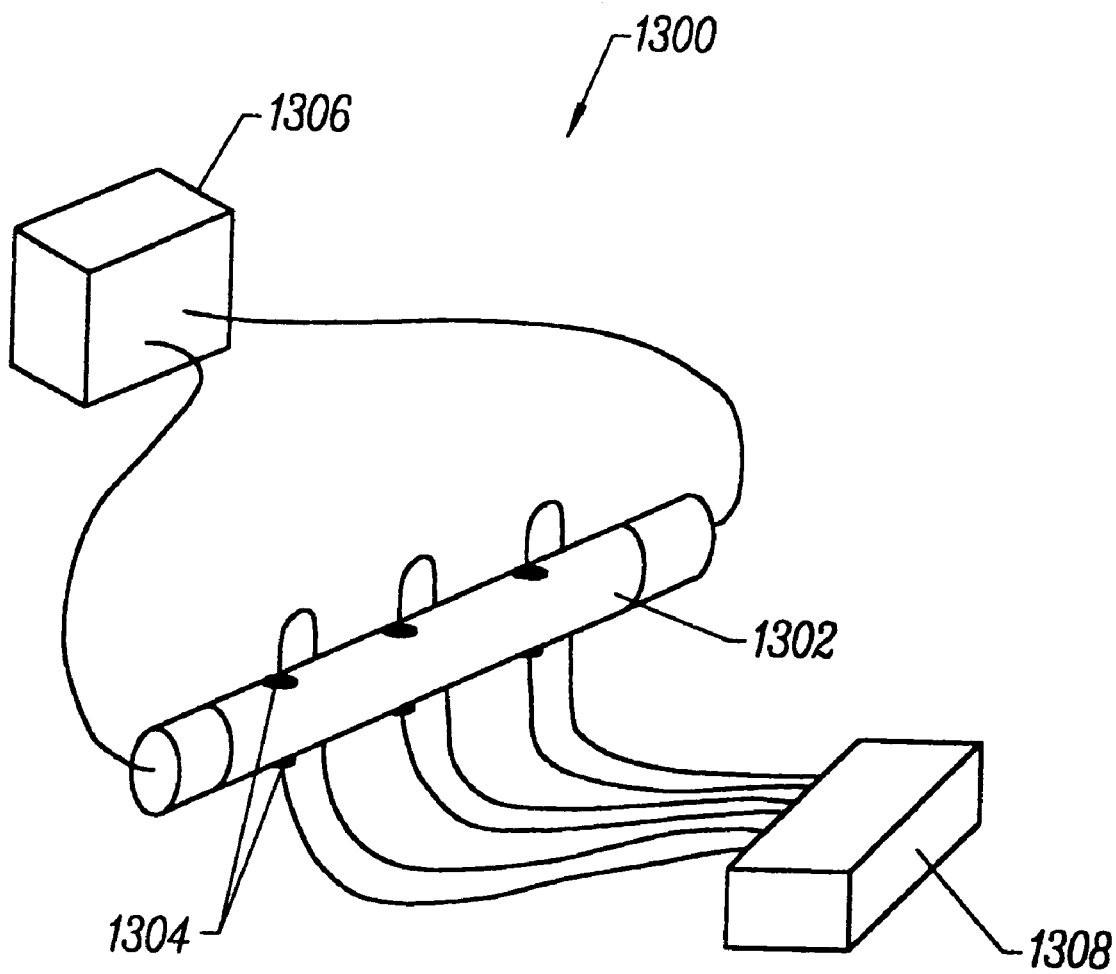
FIG. 13 is a perspective view of an illuminating light source.

FIG. 13 illustrates an illuminating light source 1300 consisting of a mercury discharge tube 1302 surrounded by infrared light emitting diodes 1304. The tube power source/controller 1306 operates the discharge tube 1302 while the LED power source/controller 1308 manages the operation of the LEDs. By surrounding the tube 1302 with the diode light sources 1304, the milky white phosphor in the tube tends to diffuse the infrared light emitted by the diodes 1304 so the infrared and visible light appear to radiate from the same directions. This uniformity in source light emission is important to accurate surface defect correction. The illuminator can be driven by leaving the visible light source 1302 on for all scans and switching the infrared source 1304 on for every third scan, as has been previously described herein. When this is done, the infrared record will also contain visible light data corresponding to the "missing" color because that is the color of the filter over the sensor making the infrared scan. The overall illumination must be adjusted so the visible light plus the infrared light will not saturate the sensor. To reduce the amount of visible light contamination, the sensitivity of the array may be decreased. This can be accomplished by shortening the integration time and/or by increasing the infrared illumination.

When using the illuminator 1300 disclosed in FIG. 13 with the visible light source 1302 constantly on, the following steps will ensure proper scanning and surface defect correction. First, the "missing" color for each pixel is calculated from the adjacent pixels as before. The estimated value for that color is then subtracted from the sensed value which includes measurements of the "missing" color in addition to the infrared information. After the subtraction, this yields recovered infrared-only information for the pixel. The final step in the process is to divide the three colors for each pixel, including the two measured colors and one estimated color, by the recovered infrared information to perform surface defect correction.

In an alternate embodiment, the gas discharge lamp 1302 can be switched off during the infrared scan. This would attenuate, but not eliminate, the contamination of the infrared measurement by visible light. The mercury bands and different phosphor components each have different persistence, so each of the three color components red, green, and blue, decays to a different degree. Typically blue light will decay fastest, and hence exhibit the least contamination, while red light decays the slowest. When using such a switched illuminator, the estimated value for the "missing" color is calculated as previously explained; however, before being subtracted from the infrared record, it is first multiplied by a constant known by measurement to represent the amount of that color remaining after the visible light source is extinguished. Typical values for the constant would be 0.2 for blue, 0.5 for green, and 0.6 for red. By switching the visible light source off during the infrared scan, there is less contamination, and therefore less to be subtracted. This also helps to reduce noise and saturation problems.

Although the present embodiment has been described with a fluorescent visible source and an LED infrared source, there are many choices for visible and infrared sources. An alternate embodiment contemplates an unswitched incandescent lamp behind a rotating filter wheel that removes infrared with a filter for two scans, and passes only infrared with a second filter for the third scan. In this embodiment, the filter wheel must be synchronized with the sensor. In another version, a visible fluorescent source can be supplemented with an incandescent source behind a filter passing only infrared light, and further behind a rotating wheel or shutter that passes the infrared light only for the infrared scan. There are many combinations of visible sources, infrared sources, filter wheels :and shutters, and these are meant only to illustrate some of the many ways to provide the required light source in which infrared light is switched on alternating with, or in addition to, visible light.

The present invention has been described with a trilinear CCD array having a pulsed infrared source to generate the infrared image. However, high speed scanners such as the Tamron Fotvix utilize an area array to avoid the time required for mechanical movement of a linear array. These area array scanners typically employ a matrix of tiny color filters over each element of the area array to sense the color image. Typically, all of the filters pass infrared light. Because the image presented to the sensor array of the present embodiment must be free of infrared light, the infrared component is removed by a filter in the light path. To use a single chip area array, two scans are performed: a conventional visible scan containing no infrared light, and a second infrared scan containing infrared light. Because all colored filters typically pass infrared light, the second scanned image has an infrared value for each pixel of the image. By dividing the visible values sensed for each pixel by the infrared values sensed for each pixel, surface defect correction may be practiced. The surface defect corrected image under the color matrix is then processed conventionally to recover the full color image.

In another embodiment using an area array, the visible light source is extinguished for the infrared scan, and the infrared light source is extinguished for the visible scan. This may be done with two light sources which are alternately excited. The infrared source can be a group of infrared LEDs, and the visible source can be a xenon discharge lamp although many other sources known in the art can be substituted to produce visible and infrared light. Alternatively, the light sources could be placed behind shutters to obviate switching each source itself. In still another alternate embodiment, a single source containing both visible and infrared light such as an incandescent lamp could be placed behind a filter wheel to alternately pass only visible light and only infrared light. In such an embodiment, the visible value sensed for each pixel is then divided by the infrared value sensed for that pixel. Finally, the resulting color matrix is decoded into full color.

In an alternate version of the present invention using an area array, the visible light is not extinguished during the infrared scan so the infrared scan also contains some visible light. The visible light contained in the value sensed for each pixel during the infrared scan is canceled by subtracting the visible value sensed for that pixel in the visible scan to leave a value representing pure infrared. By dividing the visible value by the pure infrared value, surface defect correction may be implemented.

While this invention has been described with an emphasis upon certain preferred embodiments, variations in the preferred composition and method may be used and the embodiments may be practiced otherwise than as specifically described herein. Accordingly, the invention as defined by the following claims includes all modifications encompassed within the spirit and scope thereof.

What is claimed is:

1. A method for scanning an image on a substrate containing defects which uses a plurality of sensors arranged in groups, wherein a first group is behind a first filter material selective to a first color of light and infrared light, and a second group is behind a second filter material selective to a second different color of light and infrared light, said method comprising:

illuminating the image at a first scan time with a first light source functionally free of infrared light;

sensing light of the first color with the first group of sensors to generate a first color image, and light of the second color with the second group of sensors to generate a second color image;

illuminating the image at a second scan time with a second light source containing infrared light;

sensing infrared light with at least one of the first or second group of sensors to generate an infrared image; and generating from the first color image, second color image, and infrared image, a corrected color image substantially free of the defects.

2. The method of claim 1 wherein the second light source substantially excludes light in the visible range.

3. The method of claim 2 wherein the first light source is a first switchable lamp, and the second light source is a second switchable lamp.

4. The method of claim 1 wherein the second light source emits light from a light emitting diode.

5. A method for scanning an image on a substrate containing defects which uses a plurality of sensors arranged in groups, wherein a first group is behind a first filter material selective to a first color of light and infrared light, and a second group is behind a second filter material selective to a second different color of light and infrared light, said method comprising:

illuminating the image at a first scan time with a first light source functionally free of infrared light;

sensing light of the first color with the first group of sensors to generate a first color image, and light of the second color with the second group of sensors to generate a second color image, wherein the first group and second group of sensors are arranged in first and second parallel rows separated by an offset;

illuminating the image at a second scan time with a second light source containing infrared light;

sensing infrared light with at least one of the first or second group of sensors to generate an infrared image; and generating from the first color image, second color image, and infrared image, a corrected color image substantially free of the defects.

6. The method of claim 5 wherein the first scan time is one of a first sequence of scan times with light functionally free of infrared light and the second scan time is one of a second sequence of scan times in which the image is illuminated with a light source containing infrared light.

7. The method of claim 6 wherein the first sequence of scan times includes a first series of individual scan times spaced between a second series of individual scan times of the second sequence.

8. The method of claim 7 wherein the first and second series of individual scan times each comprises two individual scan times.

9. The method of claim 7 wherein the first and second series of individual scan times each comprises three individual scan times.

10. The method of claim 9 further comprising moving the parallel rows of sensors by an incremental amount in a direction perpendicular to the parallel rows between the individual scan times of the first sequence.

11. The method of claim 7 further comprising moving the parallel rows of sensors by an incremental amount in a direction perpendicular to the parallel rows between the individual scan times of the first and second sequences.

12. The method of claim 11 further comprising conducting individual scans of the second sequence based on the incremental amount so as to spatially overlay an individual scan of the first sequence.

13. The method of claim 12 wherein an individual scan of the second sequence overlays two individual scans of the first sequence.

14. The method of claim 13 further comprising conducting a first group of individual scans selective to infrared, green, and blue light at a first pixel row site;

conducting a second group of individual scans selective to infrared, red, and blue light at a second pixel row site adjacent to the first pixel row site; and conducting a third group of individual scans selective to infrared, red, and green light at a third pixel row site adjacent to the second pixel row site.

15. The method of claim 14 wherein a value for green is calculated for a pixel at the second pixel row site.

16. The method of claim 14 wherein a value for red is calculated for a pixel at the first pixel row site, a value for green is calculated for a pixel at the second pixel row site, and a value for blue is calculated for a pixel at the third pixel row site.

17. The method of claim 15 wherein the calculation for a value of green in the second pixel row site includes the step of averaging the value for green in adjacent pixels in the first and third pixel row sites.

18. The method of claim 17 wherein the calculation further comprises calculating the change of red value in adjacent pixels between the first and second pixel row sites.

19. The method of claim 17 wherein the calculation further comprises calculating the change of red value in adjacent pixels between the first and second pixel row sites, and the change in blue value in adjacent pixels between the third and second pixel row sites.

20. A method for scanning an image on a substrate containing defects which uses a plurality of sensors arranged in groups, wherein a first group is behind a first filter material selective to a first color of light and infrared light, and a second group is behind a second filter material selective to a second different color of light and infrared light, said method comprising:

illuminating the image at a first scan time with a first light source functionally free of infrared light;

sensing light of the first color with the first group of sensors to generate a first color image, and light of the second color with the second group of sensors to generate a second color image, wherein the first group of sensors is arranged in a two dimensional grid;

illuminating the image at a second scan time with a second light source containing infrared light;

sensing infrared light with at least one of the first or second group of sensors to generate an infrared image; and generating from the first color image, second color image, and infrared image, a corrected color image substantially free of the defects.

21. A method for scanning an image on a substrate containing defects which uses a plurality of sensors arranged in groups, wherein a first group is behind a first filter material selective to a first color of light and infrared light, and a second group is behind a second filter material selective to a second different color of light and infrared light, said method comprising:

illuminating the image at a first scan time with a first light source functionally free of infrared light;

sensing light of the first color with the first group of sensors to generate a first color image, and light of the second color with the second group of sensors to generate a second color image, wherein the first color is red, the second color is green, and further comprising a third group of sensors behind a third filter material selective to blue light and infrared light;

illuminating the image at a second scan time with a second light source containing infrared light;

sensing infrared light with at least one of the first or second group of sensors to generate an infrared image; and generating from the first color image, second color image, and infrared image, a corrected color image substantially free of the defects.

22. A method for scanning an image on a substrate containing defects which uses a plurality of sensors arranged in groups, wherein a first group is behind a first filter material selective to a first color of light and infrared light, and a second group is behind a second filter material selective to a second different color of light and infrared light, said method comprising:

illuminating the image at a first scan time with a first light source functionally free of infrared light;

sensing light of the first color with the first group of sensors to generate a first color image, and light of the second color with the second group of sensors to generate a second color image;

illuminating the image at a second scan time with a second light source containing infrared light, wherein the second light source also comprises visible light;

sensing infrared light with at least one of the first or second group of sensors to generate an infrared image; and generating from the first color image, second color image, and infrared image, a corrected color image substantially free of the defects.

23. The method of claim 22 wherein the first light source is a first lamp emitting visible light, and the second light source emits a mixture of light from the first lamp and light from a switchable infrared lamp.

24. The method of claim 23 wherein the switchable infrared lamp is a light emitting diode.

25. The method of claim 23 wherein the light from the switchable infrared lamp is calculated as a difference between the second light source and the first light source.

26. An apparatus for scanning an image on a substrate containing defects comprising:
   a plurality of sensors arranged in groups, wherein a first group is behind a first filter material selective to a first color of light and infrared light, and a second group is behind a second filter material selective to a second different color of light and infrared light;
   means for illuminating the image at a first scan time with a first light source functionally free of infrared light;
   means for sensing light of the first color with the first group of sensors to generate a first color image, and light of the second color with the second group of sensors to generate a second color image;
   means for illuminating the image at a second scan time with a second light source containing infrared light;
   means for sensing infrared light with at least one of the first or second group of sensors to generate an infrared image; and
   means for generating from the first color image, second color image, and infrared image, a corrected color image substantially free of the defects.

27. The apparatus of claim 26 wherein the second light source substantially excludes light in the visible range.

28. The apparatus of claim 27 wherein the first light source is a first switchable lamp, and the second light source is a second switchable lamp.

29. The apparatus of claim 26 wherein the second light source emits light from a light emitting diode.

30. An apparatus for scanning an image on a substrate containing defects comprising:
   a plurality of sensors arranged in groups, wherein a first group is behind a first filter material selective to a first color of light and infrared light, and a second group is behind a second filter material selective to a second different color of light and infrared light, wherein the first group and second group of sensors are arranged in first and second parallel rows separated by an offset;
   means for illuminating the image at a first scan time with a first light source functionally free of infrared light;
   means for sensing light of the first color with the first group of sensors to generate a first color image, and light of the second color with the second group of sensors to generate a second color image;
   means for illuminating the image at a second scan time with a second light source containing infrared light;
   means for sensing infrared light with at least one of the first or second group of sensors to generate an infrared image; and
   means for generating from the first color image, second color image, and infrared image, a corrected color image substantially free of the defects.

31. The apparatus of claim 30 wherein the first scan time is one of a first sequence of scan times with light functionally free of infrared light, and the second scan time is one of a second sequence of scan times in which the image is illuminated with a light source containing infrared light.

32. The apparatus of claim 31 wherein the first sequence of scan times includes a first series of individual scan times spaced between a second series of individual scan times of the second sequence.

33. The apparatus of claim 32 wherein the first and second series of individual scan times each comprises two individual scan times.

34. The apparatus of claim 32 wherein the first and second series of individual scan times each comprises three individual scan times.

35. The apparatus of claim 31 wherein the parallel rows of sensors are moved by an incremental amount in a direction perpendicular to the parallel rows between the individual scan times of the first sequence.

36. The apparatus of claim 31 wherein the parallel rows of sensors are moved by an incremental amount in a direction perpendicular to the parallel rows between the individual scan times of the first and second sequences.

37. The apparatus of claim 36 wherein the incremental amount enables, in conjunction with the offset between parallel rows of sensors, individual scans of the second sequence to spatially overlay individual scans of the first sequence.

38. The apparatus of claim 37 wherein the incremental amount enables an individual scan of the second sequence to overlay two individual scans of the first sequence.

39. The apparatus of claim 38 wherein sites of overlay are pixel row sites, and wherein a first pixel row site includes individual scans selective to infrared, green, and blue light; a second pixel row site adjacent to the first pixel row site includes individual scans selective to infrared, red, and blue light; and a third pixel row site adjacent to the second pixel row site includes individual scans selective to infrared, red, and green light.

40. The apparatus of claim 39 further comprising means for calculating a value for green for a pixel at the second pixel row site.

41. The apparatus of claim 39 further comprising means for calculating a value for red for a pixel at the first pixel row site, a value for green for a pixel at the second pixel row site, and a value for blue for a pixel at the third pixel row site.

42. The apparatus of claim 40 wherein the means for calculating a value of green in the second pixel row site further comprises means for averaging the value for green in adjacent pixels in the first and third pixel row sites.

43. The apparatus of claim 42 wherein the means for calculating further comprises means for calculating the change of red value in adjacent pixels between the first and second pixel row sites.

44. The apparatus of claim 42 wherein the means for calculating further comprises means for calculating the change of red value in adjacent pixels between the first and second pixel row sites, and the change in blue value in adjacent pixels between the third and second pixel row sites.

45. An apparatus for scanning an image on a substrate containing defects comprising:
   a plurality of sensors arranged in groups, wherein a first group is behind a first filter material selective to a first color of light and infrared light, and a second group is behind a second filter material selective to a second different color of light and infrared light, wherein the first color is red, the second color is green, and further comprising a third group of sensors behind a third filter material selective to blue light and infrared light;

means for illuminating the image at a first scan time with a first light source functionally free of infrared light;

means for sensing light of the first color with the first group of sensors to generate a first color image, and light of the second color with the second group of sensors to generate a second color image;

means for illuminating the image at a second scan time with a second light source containing infrared light;

means for sensing infrared light with at least one of the first or second group of sensors to generate an infrared image; and means for generating from the first color image, second color image, and infrared image, a corrected color image substantially free of the defects.

46. An apparatus for scanning an image on a substrate containing defects comprising:

a plurality of sensors arranged in groups, wherein a first group is behind a first filter material selective to a first color of light and infrared light, and a second group is behind a second filter material selective to a second different color of light and infrared light;

means for illuminating the image at a first scan time with a first light source functionally free of infrared light;

means for sensing light of the first color with the first group of sensors to generate a first color image, and light of the second color with the second group of sensors to generate a second color image;

means for illuminating the image at a second scan time with a second light source containing infrared light, wherein the second light source emits visible light;

means for sensing infrared light with at least one of the first or second group of sensors to generate an infrared image; and means for generating from the first color image, second color image, and infrared image, a corrected color image substantially free of the defects.

47. The apparatus of claim 46 wherein the first light source is a first lamp emitting visible light, and the second light source emits a mixture of light from the first lamp and light from a switchable infrared lamp.

48. The apparatus of claim 47 wherein the switchable infrared lamp is a light emitting diode.

49. The apparatus of claim 48 wherein the light from the switchable infrared lamp is calculated as a difference between the second light source and the first light source.

50. An apparatus for scanning an image on a substrate containing defects comprising:

a plurality of sensors arranged in groups, wherein a first group is behind a first filter material selective to a first color of light and infrared light, and a second group is behind a second filter material selective to a second different color of light and infrared light;

a first light source configured to illuminate an image at a first scan time with light functionally free of infrared light, wherein the first group of sensors sense the first color of the light to generate a first color image and the second group of sensors sense the second color of the light to generate a second color image;

a second light source configured to illuminate the image at a second scan time with infrared light, wherein at least one of the first or second group of sensors sense the infrared light to generate an infrared image; and at least one computing device configured to generate a corrected color image from the first color image, the second color image, and the infrared image.

* * * * *